United States Patent [19]

Miller

[11] Patent Number: 5,338,082
[45] Date of Patent: Aug. 16, 1994

[54] APPARATUS FOR SECURING FABRIC TO A VISOR

[75] Inventor: Douglas C. Miller, Hersey, Mich.

[73] Assignee: Plasta Fiber Industries Corp., Marlette, Mich.

[21] Appl. No.: 869,462

[22] Filed: Apr. 15, 1992

[51] Int. Cl.⁵ ............................................. B60J 3/00
[52] U.S. Cl. .................... 296/97.1; 296/97.2; 29/91; 160/404
[58] Field of Search ............. 296/97.1, 97.2, 97.5; 29/91, 91.1, 91.5; 362/83.1; 160/404

[56] References Cited

U.S. PATENT DOCUMENTS

| | | | |
|---|---|---|---|
| 3,217,786 | 11/1965 | Earl | 160/404 |
| 3,308,598 | 3/1967 | Wilson | 160/404 X |
| 4,411,467 | 10/1983 | Cziptschirsch et al. | 296/07.5 |
| 4,494,789 | 1/1985 | Flowerday | 296/97.1 X |
| 4,570,990 | 2/1986 | Flowerday | 296/97.1 |
| 4,685,723 | 8/1987 | Canadas | 296/97.5 |
| 4,763,946 | 8/1988 | Robbins et al. | 296/97.1 |
| 4,867,500 | 9/1989 | Oosterbaan et al. | 296/97.1 |
| 4,922,391 | 5/1990 | Dykstra | 296/97.2 |
| 5,033,529 | 7/1991 | Koschade | 160/404 X |
| 5,160,203 | 11/1992 | Viertel et al. | 296/97.5 |
| 5,205,639 | 4/1993 | White et al. | 296/97.2 X |

*Primary Examiner*—Dennis H. Pedder
*Attorney, Agent, or Firm*—Brooks & Kushman

[57] ABSTRACT

A mechanism for attaching an outer covering to a molded shell-type vehicle sun visor having a pair of shell halves and an aperture in one shell half. The mechanism includes a stackes attached to or integral with an inner surface of the shell half and a bezel which cooperates with the stakes to sandwich the free edge portions of the covering along an inner surface of a shell half around the aperture to prevent the covering from working loose.

6 Claims, 3 Drawing Sheets

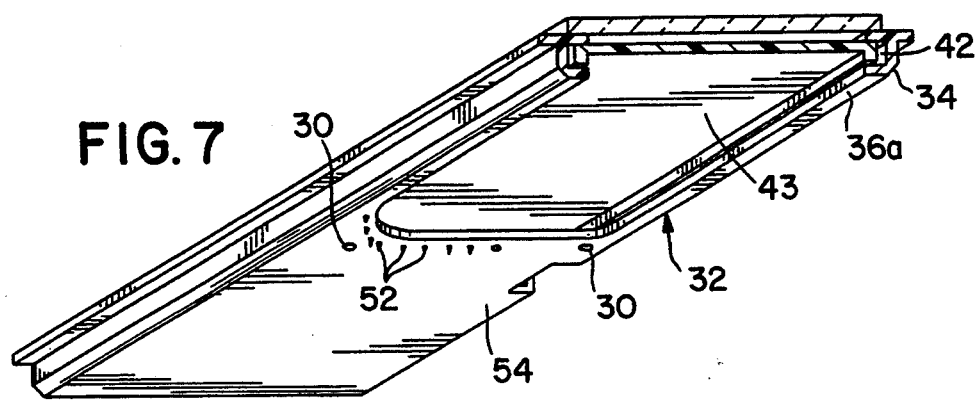
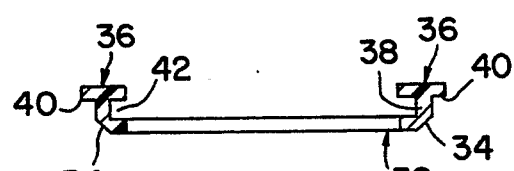
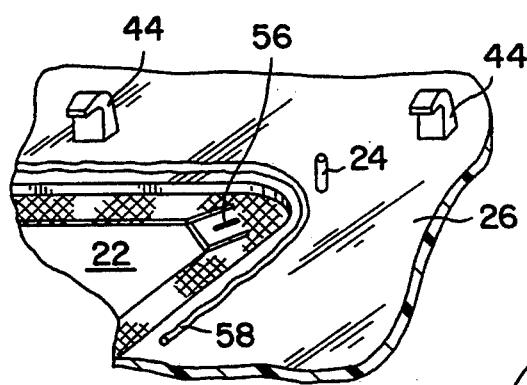
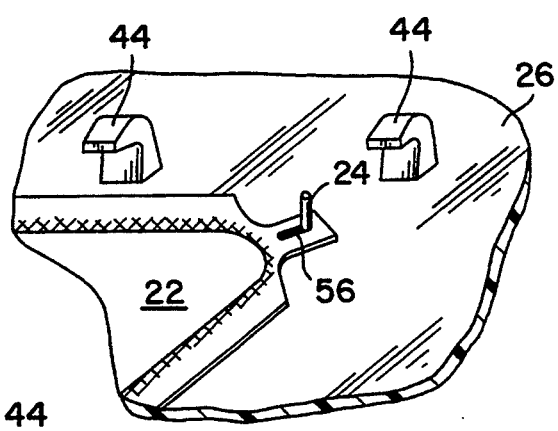
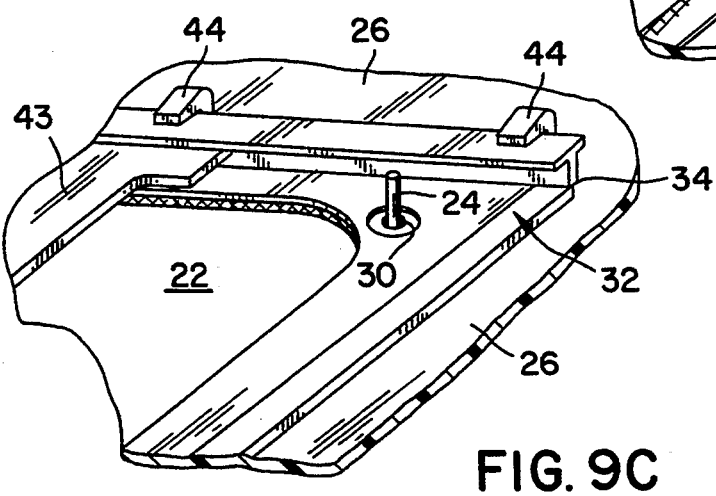

APPARATUS FOR SECURING FABRIC TO A VISOR

TECHNICAL FIELD

This invention relates to visors and in particular to methods and mechanisms for securing coverings to visors having an aperture in an inner molded shell.

BACKGROUND ART

Many visors employed in automobiles are made of a molded, shell-type core covered by a fabric which is colored and textured to match the interior upholstery of the vehicle. Many such visors contain a vanity mirror housed within an aperture in the molded shell. Various methods have been utilized to secure the covering to the aperture.

For example, U.S. Pat. No. 4,411,467 to Cziptschirsch et al discloses a visor body having a recess for holding a mirror. The section of the covering layer overlapping the recess is more expandable than the remainder of the covering layer. To make this section more expandable, it is punched with holes defining a lattice of the material, and various shaped holes are disclosed. In this configuration, the covering does not have a peripheral free end portion located within the aperture and between shell halves.

U.S. Pat. No. 4,685,723 to Canadas discloses a mirror disposed in a detachable support which is capable of being fixed in the cavity of a visor by clipping the support into corresponding openings provided in a middle insert placed on the bottom of the cavity and covered with a sheet of PVC. In this configuration, the metal support insert is placed in the bottom of the cavity and covered with a film of foam, and then with the whole of the shell it is covered with the covering of PVC. Thereafter, the elastic tabs at the support of the mirror can be clipped through the thickness of the plastics covering of the shield.

U.S. Pat. No. 4,922,391 to Dykstra discloses a vanity mirror package which is lockably retained within a visor body having a recess. In this configuration, the vanity mirror package is snap-fitted and held within the recess by means of a pair of facing spaced resilient arms which extend rearwardly from the front core half and include inwardly projecting locking tabs on their ends cooperating with backing tabs to hold the vanity mirror package in place. In such a configuration, the free end portions of the covering around the aperture are not secured by being sandwiched by a cooperation between a retaining means and a fastening means to the inner surface of the shell half.

U.S. Pat. No. 4,494,789 to Flowerday discloses a visor having a snap-in frame which engages its side walls compressing the upholstered fabric against the wall of the visor. In this configuration, the free end portions of the covering extend through apertures in two shell halves and are compressed against the boundary wall of the aperture by means of a spring wire frame.

The present invention incorporates all of the known benefits of an inner plastic shell while improving the fabric attachment mechanism around an aperture.

SUMMARY OF THE INVENTION

An object of the present invention is to provide an improved, relatively inexpensive attachment mechanism for securing coverings to the inside of visors having an aperture in a molded shell.

Accordingly, an object of the present invention is to provide a relatively inexpensive mechanism for sandwiching coverings to the inside of a visor having an aperture in an inner molded shell to prevent the covering from working loose.

Another object of the present invention is to provide an attachment mechanism for a molded visor shell which cooperates with the inner surface of the visor shell to trap and sandwich a covering on the visor shell.

A specific object of the present invention is to provide an attachment mechanism for use with a visor having a molded shell having upper and lower shell halves and an aperture in one of the shell halves. The molded shell has an outer covering having free edge portions for securing the covering around the aperture so that the covering is prevented from working loose. A retaining means is provided cooperating with a fastening means which is attached to or integral with an inner surface of a shell half. The covering surrounds the molded shell such that free edge portions of the covering extend into the aperture to the inner surface of the shell half. The retaining means cooperates with the fastening means to hold the free edge portions on the inner surface of a shell half and sandwich the free edge portions of the covering between the retaining means and the inner surface of the shell half.

Another specific object of the present invention is to provide a method of attaching a covering to a visor having a molded shell with upper and lower shell halves. One shell half has an aperture for receiving a visor mirror or the like. First, providing a fastening means configured to match the aperture. Next, providing a free edge portion in the covering defining an opening smaller than the aperture. Pulling the free edge portion of the covering through the aperture from one side of the shell half to the other side thereof and retaining the free edge portions by retaining means. Then sandwiching the free edge portion of the covering between the retaining means and the inner surface of the shell half.

To obtain the above object and other objects of the present invention, a visor includes a molded shell having upper and lower halves and an aperture in one of the halves. The outer covering has a free end portion for securing the covering around the aperture on the inside of the visor so that the covering is prevented from working loose. The mechanism includes a retaining means cooperating with a fastening means on the inner surface of a shell half for initially retaining the free edge portions of the covering and then sandwiching the free edge portions against the inner surface of the shell half.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 7 is a perspective view of an alternative embodiment of the present invention;

FIG. 8 is a sectional view of a bezel of the present invention; and

FIGS. 9A-9D are a series of partial views illustrating the assembly process of one of the embodiments of the present invention.

BEST MODE FOR CARRYING OUT THE INVENTION

Referring to FIGS. 1 through 9, FIG. 1 illustrates a visor, generally indicated at 10, including a molded shell, generally indicated at 12, having upper and lower shell halves, generally indicated at 14 and 16, respectively.

The visor 10 includes a covering, generally indicated at 18, the covering having free-edge portions 20. The upper shell half 14 has an aperture 22 centrally located in the upper shell half 14, generally rectangular in shape.

Figure 1:
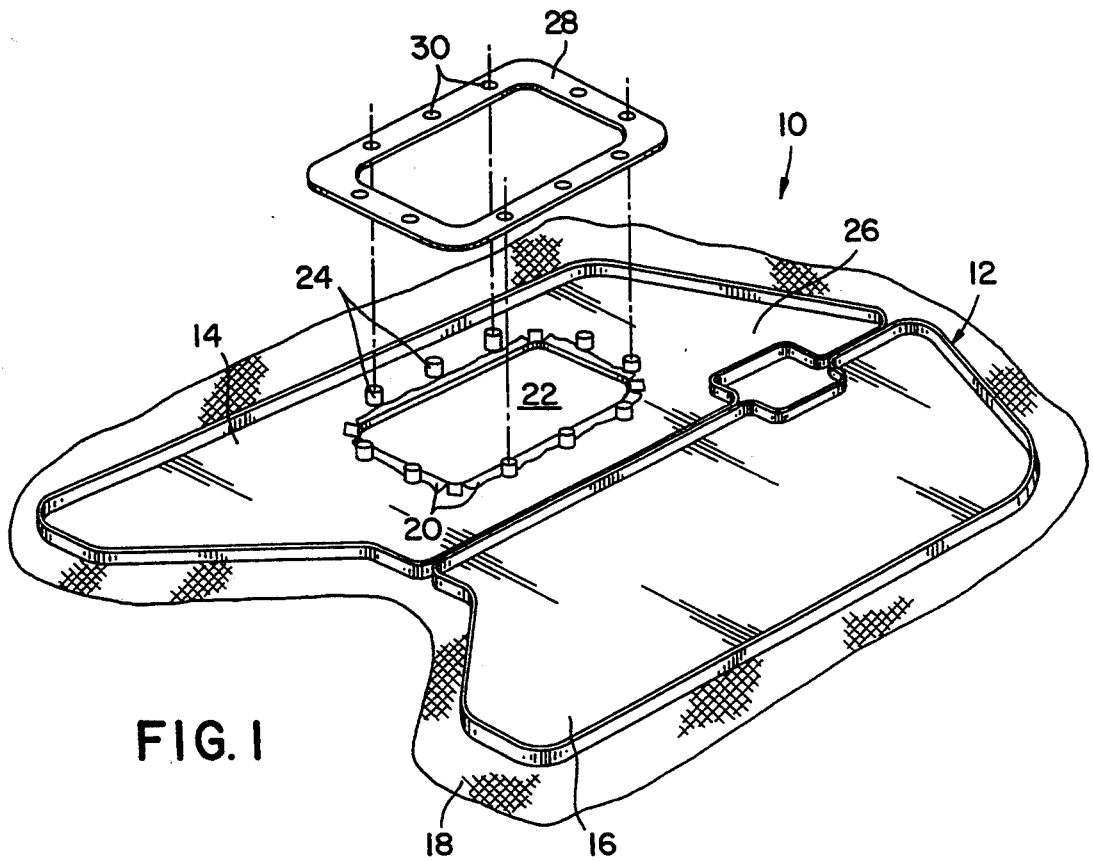
FIG. 1 is an exploded perspective view of an attachment mechanism of a vehicle visor assembly during construction thereof in accordance with the present invention.
Figure 2:
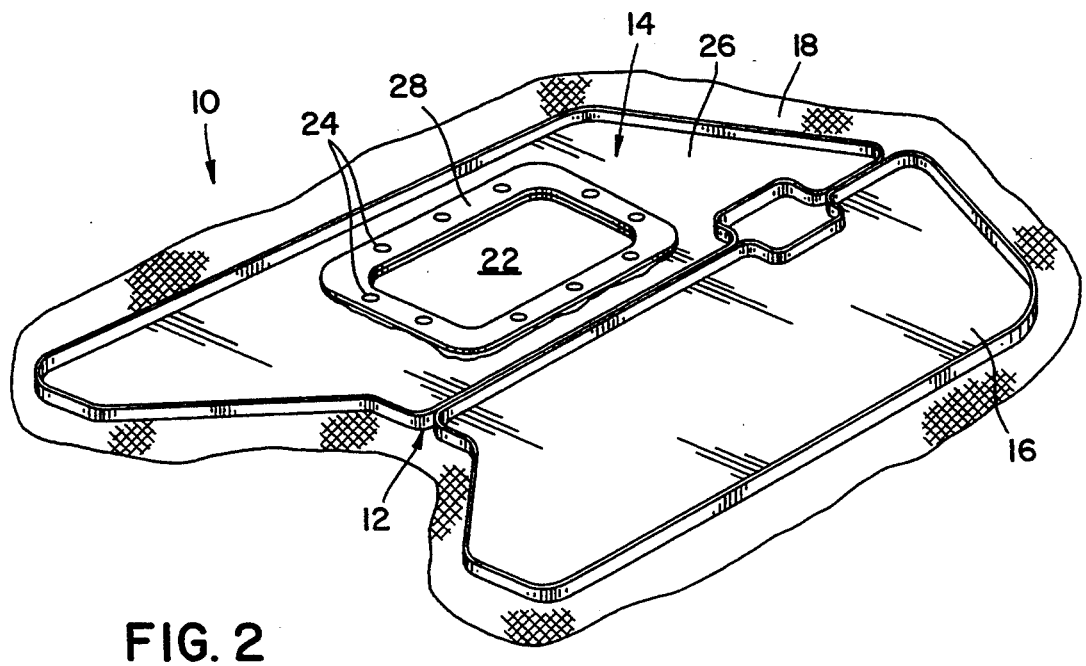
FIG. 2 is a perspective view of the visor assembly during a further step in the construction thereof showing the trapping and sandwiching of a visor covering by a bezel along the interior surface of an apertured shell half.
Figure 3:
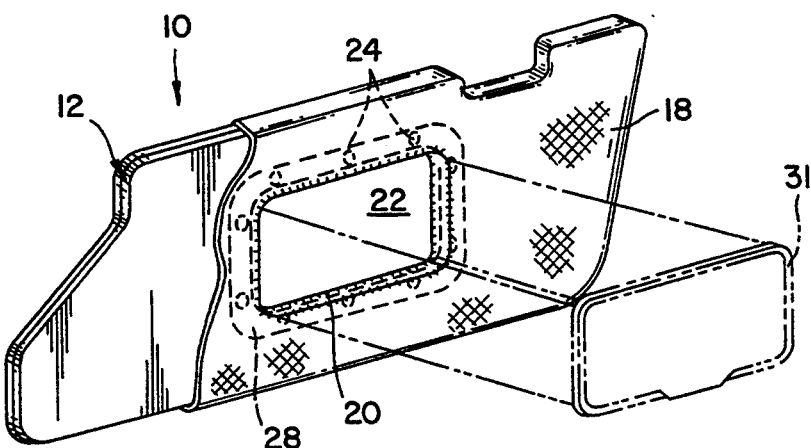
FIG. 3 is a perspective view of the visor assembly in a still further step in the construction thereof showing the concealment of the attachment mechanism within the visor around an opening exposing a mirror mounted within.

The visor 10 includes a fastening means, in the embodiment shown in FIG. 1, the fastening means is a plurality of stakes 24 integrally formed around the peripheral edge of the aperture 22. The stakes 24 are integrally connected to an inner surface 26 of the upper half 14 such that the stakes 24 project perpendicularly upward from the inner surface 26.

As shown in FIG. 1, the retaining means, in this embodiment is a bezel 28 constructed of polymeric material similar to that of the molded shell 12 and is configured to be slightly larger than the aperture 22. The bezel 28 has a series of openings 30 which mate with the stakes 24 to enable the bezel 28 to be seated on the stakes 24.

In operation, the covering 18 is placed around the outside of the molded shell 12 before the two halves 14 and 16 are folded and joined. The free edge portions 20 of the covering 18 are placed or pulled into the aperture 22 such that the free edge portions 20 are inside and along the inner surface 26 of the upper half 14. The bezel 28 is then seated on the stakes 24 (in alternative embodiments, the bezel 28 may be fastened by alternative means such as snaps or adhesives). The free edge portions 20 are put under tension by pulling to smooth out the covering 18 and then the bezel 28 is pressed downward over the stakes 24 against the inner surface 26. The stakes 24 are then heated and/or mashed down to securely fasten the bezel 28 against the inner surface 26, thereby squeezably securing or sandwiching the covering 18 around the aperture 22 preventing it from loosening when the shell halves are folded and joined. A mirror 31 (FIG. 3) is secured, face up, within the lower half 16. The two halves 14 and 16 are then closed to form the completed visor 10.

FIGS. 4 through 7 illustrate alternative embodiments of the present invention. Rather than a bezel 28, a sheath 32 is utilized to retain the covering 18. The sheath 32 is molded as a single piece such that it has a generally horizontal configuration. Near each side is located a living hinge 34. Laterally located relative the living hinges 34, are side pieces 36. The side pieces 36, in the embodiments presented, are either L-shaped side pieces 36a (as in FIGS. 4 and 5) or are T-shaped side pieces 36b (as in FIGS. 6 and 7). The living hinges 34 are configured such that the side pieces 36 hinge upward to form side walls 38 and flanges 40. The side walls 38 have cammed surfaces which form protrusions 70. The flanges 40 cooperate with fastening means to secure the sheath 32 to the upper half 14, while cooperation between the side walls 38 and the flanges 40 provide a channel 42 for a sliding door 43.

In the embodiments shown in FIG. 7, the sheath 32 incorporates a notch which allows the door 43 to interact with a mechanism to actuate a lighting system for an illuminated version of this visor.

Figure 4:
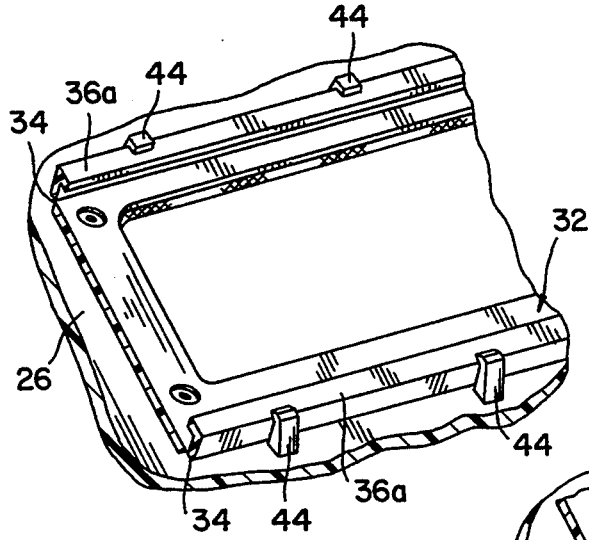
FIG. 4 is a perspective view of the visor assembly illustrating an alternative embodiment of the present invention.
Figure 5:
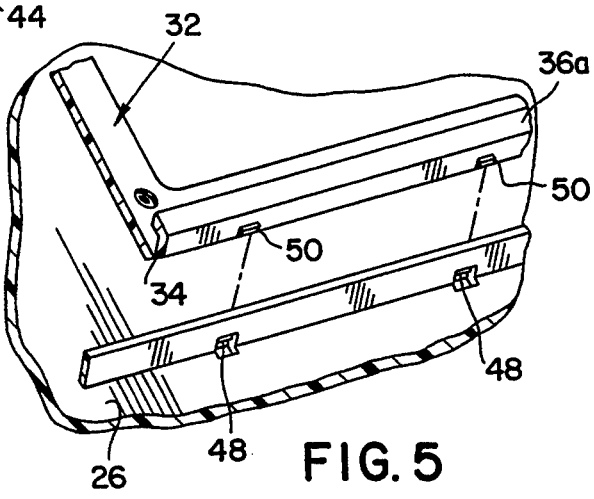
FIG. 5 is a view similar to that shown in FIG. 4 illustrating an alternative embodiment of the present invention.
Figure 6:
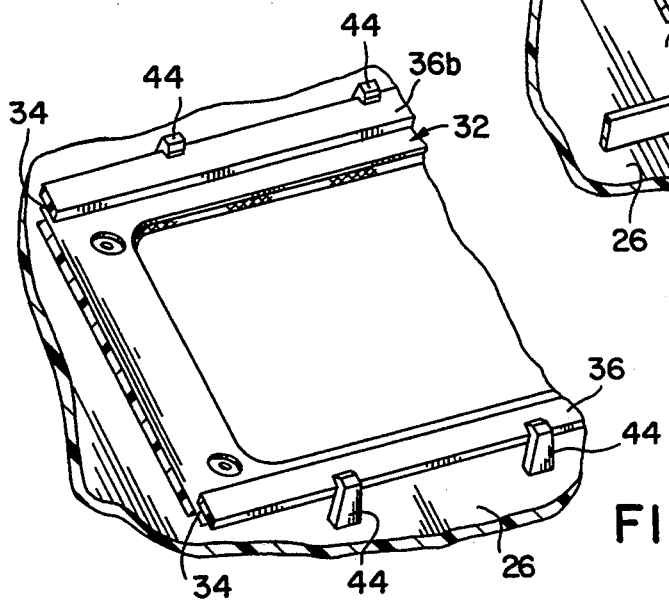
FIG. 6 is a perspective view of an alternative fastening means of the present invention.

In the embodiments shown in FIGS. 4, 6, and 9, the sheath is retained by four snaps 44 which cooperate with the flanges 40 to secure the sheath 32 to the inner surface 26 of the upper shell half 14. The embodiment shown in FIG. 5 utilizes two support rails 46 (only one of which is shown) which each have two recesses 48 which cooperate with protrusions 50 located on the side walls 38 for fastening the sheath 32 to the inner shell 14.

As with the bezel 28, each embodiment of the sheath 32 contains openings 30 which cooperate with the stakes 24 to assist in fastening the sheath 32 to the upper shell 14.

FIG. 7 illustrates the use of a plurality of sharp prongs 52 which are used in addition to the stakes and are integrally connected to the underside 54 of the sheath 32 surrounding the aperture 22 to improve the retention of the free edge portions 20 of the covering 18.

As illustrated in FIG. 9, a slit 56 is made in the free-edge portions 20 of the covering 18 at locations adjacent the stakes 24. Then a bead of hot melt glue 58 is placed along the periphery of the aperture 22. Next, the free-edge portions 20 containing the slit 56 are placed over the stakes 24 and the remaining free-edge portions 20 are pressed down onto the bead of hot melt glue 58 (alternatively the sharp prongs 52 as shown in FIG. 7 are utilized). The sheath 32 is then placed over the aperture 22 such that the openings 30 in the sheath 32 are mated with the stakes 24 to squeeze the covering 18 between the sheath 32 and the inner surface 26. Heat and/or pressure are then applied to the stakes 24 until they are mashed down securing the sheath 32. A slidable door 43 is then positioned within the door channel 42 completing the assembly of the sheath 32. The channel extends beyond the aperture sufficiently to allow full opening as seen in FIG. 7. Alternatively, the slidable door 43 would be placed within the sheath 32 prior to placing the sheath 32 over the aperture 22.

While the best mode for carrying out the invention has been described in detail, those familiar with the art to which this invention relates will recognize various alternative designs and embodiments for practicing the invention as defined by the following claims.

What is claimed is:

1. An attachment mechanism for securing a covering to an outer surface of a visor so that said covering is prevented from working loose, the visor having a molded shell including upper and lower halves positionable together and an aperture in the upper shell half between inner and outer surfaces thereof adapted to reveal a mirror disposed within the visor when the upper and lower shell halves thereof are positioned together, the attachment mechanism comprising:

- a plurality of stakes extending from the inner surface of the upper shell half;
- a bezel shaped to conform to the inner surface of the upper shell half and to surround the aperture, said bezel defining therein a plurality of openings each to receive therethrough one of said plurality of stakes, said plurality of stakes being deformable to secure said bezel to the inner surface of the upper shell half,
- the covering surrounding the outer surface of the shell and including a free edge portion extending from the outer surface through the aperture to the inner surface of the upper shell half, the free edge portion defining therein a plurality of slits extending toward the aperture, each of the plurality of slits receiving therethrough one of the plurality of stakes to maintain the free edge portion in position in preparation of the placement of said bezel against the inner surface of the upper shell half.

2. The attachment mechanism of claim 1, further including:

- a door positionable between the mirror and the aperture to obscure the mirror,
- said bezel having a generally rectangular shape defined by two spaced apart longitudinal members and two spaced apart lateral members, said longitudinal members forming a pair of mutually opposed C-shaped channels to cooperatively and slidably support said door, said longitudinal members extending sufficiently beyond one end of the aperture to allow said door to slide from a position totally obscuring the mirror to a position totally revealing the mirror.

3. The attachment mechanism of claim 2, further including a plurality of snaps extending from the inner surface of the upper shell half, said snaps engaging with said bezel to secure said bezel against the inner surface of the upper shell half to sandwich the free edge portion of the covering therebetween.

4. The attachment mechanism of claim 2, further including a layer of adhesive disposed on said inner surface of the upper shell half to aid in retaining the free edge portion of the covering in position when the latter is squeezably sandwiched between the bezel and the inner surface of the upper shell half.

5. The attachment mechanism of claim 2, further including:

- a pair of substantially parallel and elongate support rails disposed on the inner surface of the upper shell half and coextending along opposite sides of said aperture, each of said support rails defining a plurality of recesses therein,
- said longitudinal members of said bezel having a plurality of protrusions that cooperate with the plurality of recesses in said support rails to secure said bezel between said support rails and against said inner surface of the upper shell half to squeezably sandwich the free edge portion of the covering between said bezel and the inner surface.

6. The attachment mechanism of claim 2, further including a plurality of sharp prongs extending from said bezel to engage and to assist in retaining the free edge portion of the covering in position when the latter is squeezably sandwiched between the bezel and the inner surface of the upper shell half.

* * * * *